(12) United States Patent
Kim et al.

(10) Patent No.: US 12,128,733 B2
(45) Date of Patent: Oct. 29, 2024

(54) INTEGRATED THERMAL MANAGEMENT CIRCUIT FOR VEHICLE

(71) Applicants: Hyundai Motor Company, Seoul (KR); Kia Corporation, Seoul (KR); Hyundai Wia Corporation, Gyeongsangnam-Do (KR)

(72) Inventors: Man Hee Kim, Gyeonggi-do (KR); Man Ju Oh, Gyeonggi-do (KR); Sang Shin Lee, Gyeonggi-do (KR)

(73) Assignees: Hyundai Motor Company, Seoul (KR); Kia Corporation, Seoul (KR); Hyundai Wia Corporation, Gyeongsangnam-do (KR)

( * ) Notice: Subject to any disclaimer, the term of this patent is extended or adjusted under 35 U.S.C. 154(b) by 348 days.

(21) Appl. No.: 17/632,471

(22) PCT Filed: Apr. 8, 2020

(86) PCT No.: PCT/KR2020/010261
§ 371 (c)(1),
(2) Date: Feb. 2, 2022

(87) PCT Pub. No.: WO2021/025426
PCT Pub. Date: Feb. 11, 2021

(65) Prior Publication Data
US 2022/0281285 A1 Sep. 8, 2022

(30) Foreign Application Priority Data
Aug. 5, 2019 (KR) ........................ 10-2019-0094856

(51) Int. Cl.
*B60H 1/00* (2006.01)
*B60H 1/32* (2006.01)

(52) U.S. Cl.
CPC ..... *B60H 1/00392* (2013.01); *B60H 1/00278* (2013.01); *B60H 1/00885* (2013.01); *B60H 1/3228* (2019.05)

(58) Field of Classification Search
CPC ............ B60H 1/00392; B60H 1/00278; B60H 1/00885; B60H 1/3228
See application file for complete search history.

(56) References Cited

U.S. PATENT DOCUMENTS

2012/0205088 A1* 8/2012 Morisita ................... B60L 1/02
62/243
2016/0107508 A1    4/2016 Johnston
(Continued)

FOREIGN PATENT DOCUMENTS

| CN | 104602943 A | 5/2015 |
| CN | 106921003 A | 7/2017 |

(Continued)

OTHER PUBLICATIONS

Office Action issued May 25, 2023 in corresponding Chinese Application No. 202080056147.6.

*Primary Examiner* — Marc E Norman
(74) *Attorney, Agent, or Firm* — Fox Rothschild LLP (57) ABSTRACT

An integrated thermal management circuit for a vehicle includes an electrical component line having a first radiator, a battery line having a second radiator, an integration line branching from the electrical component line and the battery line and joined to the electrical component line and the battery line, a refrigerant line having a cooling core and in which a refrigerant flows, a chiller connected to the integration line and the refrigerant line, and a control valve provided to control a flow of coolant from the integration line through the chiller.

12 Claims, 9 Drawing Sheets

(56) References Cited

U.S. PATENT DOCUMENTS

| | | | | |
|---|---|---|---|---|
| 2017/0106725 A1* | 4/2017 | Kim | ............... | B60H 1/00428 |
| 2017/0282676 A1* | 10/2017 | Janier | ............ | B60H 1/00278 |
| 2020/0353796 A1* | 11/2020 | Oh | ..................... | B60H 1/143 |
| 2021/0016632 A1* | 1/2021 | Oh | ................. | B60H 1/00278 |

FOREIGN PATENT DOCUMENTS

| | | |
|---|---|---|
| JP | 2014-061873 A | 4/2014 |
| KR | 101448656 B1 | 10/2014 |
| KR | 101703604 B1 | 2/2017 |
| KR | 2017-0085160 A | 7/2017 |

* cited by examiner

INTEGRATED THERMAL MANAGEMENT CIRCUIT FOR VEHICLE

CROSS-REFERENCE TO RELATED APPLICATION

This application is a National Phase application filed under 35 USC 371 of PCT International Application No. PCT/KR2020/010261, with an International Filing Date of Aug. 4, 2020, which claims priority to Korean Patent Application No. 10-2019-0094856, filed on Aug. 5, 2019, the entire contents of which are incorporated herein by reference.

TECHNICAL FIELD

The present invention relates to an integrated thermal management circuit for a vehicle and, more particularly, to an integrated thermal management circuit that simultaneously controls the flow of coolant in an electric component-cooling circuit and a battery-cooling circuit using a single control valve.

BACKGROUND ART

Recently, electric vehicles are emerging as a social issue to implement environmentally friendly technologies and to solve an environmental problem such as energy depletion. Electric vehicles operate using a motor that receives electricity from a battery and outputs power. Therefore, electric vehicles have been spotlighted as eco-friendly cars in that such electric vehicles have the advantage of no emission of carbon dioxide, very small noise, and higher energy efficiency of the motor than that of an engine.

The core technology in implementing such an electric vehicle is a technology related to a battery module, and research on light reduction, miniaturization, and short charging time of batteries have been actively conducted recently. The battery module should be used in the optimal temperature environment to maintain optimal performance and long lifetime. However, due to heat generated during operation and external temperature changes, it is difficult to use the battery module in an optimal temperature environment.

Recently, an integrated thermal management system has been constructed in which an indoor air conditioning system of a vehicle is integrated with an air conditioning system for the battery.

However, according to the related art, since the flow of coolant in a battery-cooling circuit and an electric component-cooling circuit is controlled with respective valves provided therein, a problem arises in that the number of parts is increased, and the control of coolant is thus complicated.

The related art may be referred to KR10-1448656 (B1).

The foregoing is intended merely to aid in the understanding of the background of the present invention, and is not intended to mean that the present invention falls within the purview of the related art that is already known to those skilled in the art.

DISCLOSURE

Technical Problem

The present invention has been made keeping in mind the above problems occurring in the related art, and an object of the present invention is to provide an integrated thermal management circuit that simultaneously controls the flow of coolant in an electric component-cooling circuit and a battery-cooling circuit in a vehicle using a single control valve.

Technical Solution

In order to achieve the above object, according to an aspect, the present invention provides an integrated thermal management circuit for a vehicle, the integrated thermal management circuit including: an electrical component line in which coolant flowing therein heat-exchanges with electrical components and having a first radiator; a battery line in which coolant flowing therein heat-exchanges with a high voltage battery and having a second radiator; an integration line branching from the electrical component line and the battery line and extending, at a branch point thereof, to the electrical component line and the battery line, respectively, so that respective coolant from the electrical component line and the battery line is joined and flows into the electrical component line and the battery line, respectively, at the branch point, along a flow direction; a refrigerant line having a cooling core for indoor air conditioning and in which a refrigerant flows; a chiller connected to the integration line and the refrigerant line so that the coolant from the electric component line or the battery line and the refrigerant from the refrigerant line exchange heat with each other; and a control valve positioned at the branch point of the integration line to control a flow of coolant from the integration line through the chiller.

The integration line may branch at a point before the coolant that has passed through the electric components in the electric component line flows into the first radiator.

The integration line may branch at a point before the coolant that has passed through the high voltage battery in the battery line flows into the second radiator.

The coolant having passed through the first radiator in the electronic component line and the coolant having passed through the second radiator in the battery line may separately flow into a reservoir tank.

The control valve may be operable to adjust a flow ratio between the coolant from the electric component line through the first radiator and the coolant from the integration line through the chiller.

The control valve may be operable to adjust a flow ratio between the coolant from the battery line through the second radiator and the coolant from the integration line through the chiller.

The control valve may have a plurality of inlets and outlets, wherein the inlets are connected to the first radiator of the electrical component line, the second radiator of the battery line, and the chiller of the integration line, respectively, and the outlets are connected to the electric component in the electric component line and the high voltage battery in the battery line, respectively.

The integrated thermal management circuit may further include: an indoor heating line in which coolant flows and having a heating core for indoor air conditioning, a water heater, and a water-cooled condenser provided to be heat-exchanged with a refrigerant from the refrigerant line; and a first battery heating line and a second battery heating line branching from or jointed to the indoor heating line and connected to an upstream point and a downstream point, respectively, of the high voltage battery in the battery line from the high voltage battery, wherein a heating control valve is provided at a point where the indoor heating line branches into the first battery heating line, or the second battery heating line is joined to the indoor heating line.

The integrated thermal management circuit may further include: a controller configured to control the control valve for controlling the coolant from the integration line through the chiller to flow into the electric component line or the battery line, wherein the controller is configured to control the control valve to allow the coolant from the integration line through the chiller to flow into the electric component line in a first mode for recovering the waste heat of the electrical component with a refrigerant.

The integrated thermal management circuit may further include: a controller configured to control the control valve for controlling the coolant from the integration line through the chiller to flow into the electric component line or the battery line, wherein the controller is configured to control the control valve to allow the coolant from the integration line through the chiller to flow into the battery line in a second mode for recovering the waste heat of the high voltage battery with a refrigerant.

The integrated thermal management circuit may further include: a controller configured to control the control valve for controlling the coolant from the integration line through the chiller to flow into the electric component line or the battery line, wherein the controller is configured to control the control valve to block the coolant from the integration line from flowing in a third mode in which the waste heat of the electric component or the high voltage battery is not recovered.

The integrated thermal management circuit may further include: a shut-off valve located at a point branching from the electric component line or the battery line and joined to the integration line to block or allow a flow of coolant.

In another aspect, the present invention provides an integrated thermal management circuit for a vehicle, the integrated thermal management circuit including: an electrical component line in which coolant flowing therein heat-exchanges with electrical components and having a first radiator; a battery line in which coolant flowing therein heat-exchanges with a high voltage battery and having a second radiator; an integration line branching from the electrical component line and joined to the battery line while bypassing the first radiator; a refrigerant line having a cooling core for indoor air conditioning and in which a refrigerant flows; a chiller connected to the integration line and the refrigerant line so that the coolant from the electric component line or the battery line and the refrigerant from the refrigerant line exchange heat with each other; and a control valve operable to control a flow ratio between the coolant from the integration line through the chiller and the coolant from the battery line through the second radiator.

Advantageous Effects

According to the integrated thermal management circuit for a vehicle, it is possible to selectively recover the waste heat of the electric components and the high voltage battery with only a single chiller.

Thereby reducing the number of the parts required, having excellent space utilization and packaging effects, and reducing the manufacturing cost.

MODE FOR INVENTION

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 1:
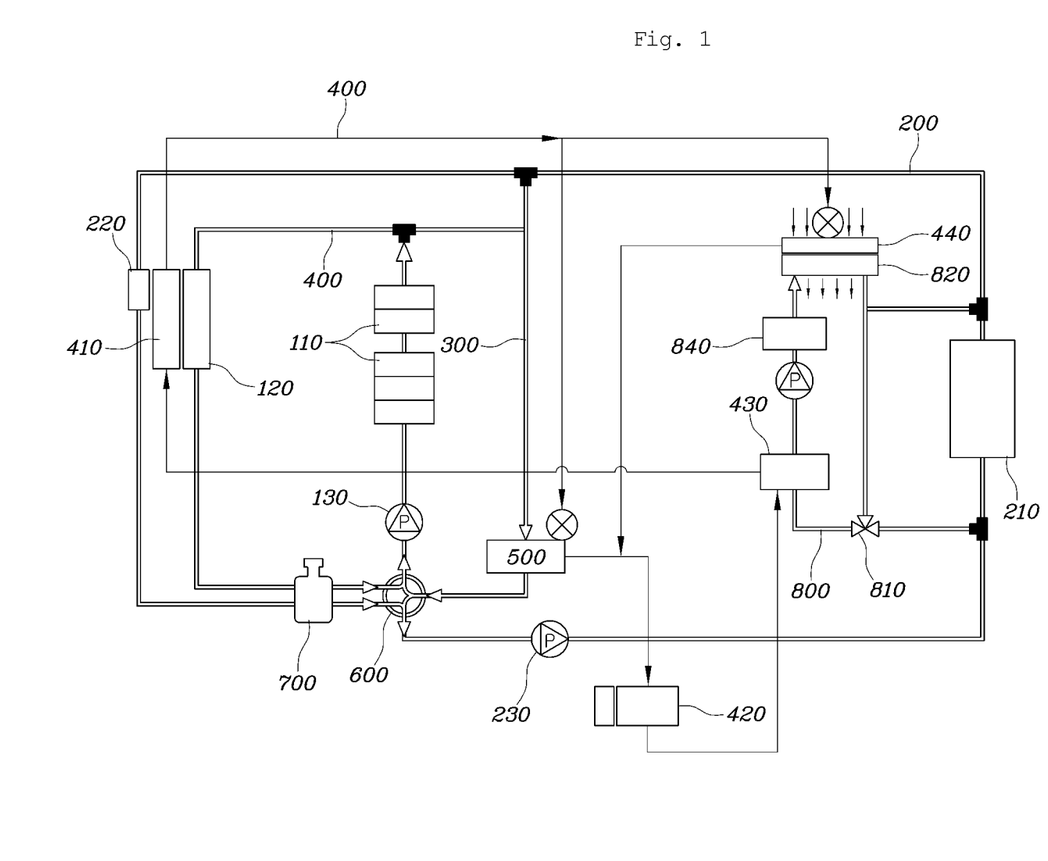
FIG. 1 is a circuit diagram illustrating an integrated thermal management circuit of a vehicle according to an exemplary embodiment of the present invention.
Figure 2:
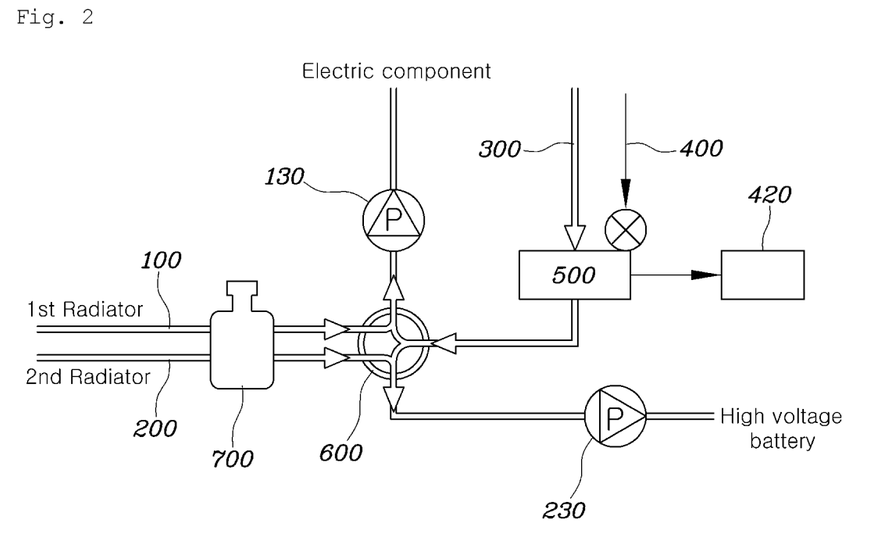
FIG. 2 illustrates a thermal management module included in the integrated thermal management circuit of a vehicle according to an embodiment of the present invention.

FIG. 1 is a circuit diagram illustrating an integrated thermal management circuit of a vehicle according to an exemplary embodiment of the present invention, and FIG. 2 illustrates a thermal management module included in the integrated thermal management circuit of a vehicle according to an embodiment of the present invention.

Referring to FIGS. 1 and 2, the integrated thermal management circuit for a vehicle according to an embodiment of the present invention includes: an electrical component line 100 having a first radiator 120 and in which coolant flowing therein heat-exchanges with electrical components; a battery line 100 having a second radiator 220 and in which coolant flowing therein heat-exchanges with a high voltage battery; an integration line 300 branching from the electrical component line 100 and the battery line 200 and extending, at a branch point thereof, to the electrical component line 100 and the battery line 200, respectively, so that respective coolant from the electrical component line 100 and the battery line 200 is joined and flows into the electrical component line 100 and the battery line 200, respectively, at the branch point, along a flow direction; a refrigerant line 400 having a cooling core 440 for indoor air conditioning and in which a refrigerant flows; a chiller 500 connected to the integration line 300 and the refrigerant line 400 so that the coolant from the electric component line 100 or the battery line 200 and the refrigerant from the refrigerant line 400 exchange heat with each other; and a control valve 600 positioned at the branch point of the integration line 300 to control a flow of coolant through the chiller 500 from the integration line 300.

Vehicles are equipped with various heating devices, such as electric components, including a motor and an inverter, a high voltage battery, an indoor air conditioning device, and the like. Since each needs to be managed in different temperature ranges and has a different operating point, a complex circuit as shown in FIG. 1 is required to independently implement the operating conditions of the heating devices.

The electric component line 100 is connected to an electric component core 110 and the first radiator 120 is provided thereto. Coolant flows through the electric component line 100 with the power from a first motor 130.

The electric component core 110 may conceptually include a heat dissipation unit directly connected to an electric component or the like, and a heat dissipation unit indirectly connected to an electric component or the like through a separate coolant line.

The first radiator 120 provided in the electric component line 100 may be cooled by heat exchange with air outside of a vehicle, and the coolant cooled by passing through the first radiator 120 is circulated through the electric component core 110 so that the electric component core 110 may be cooled.

The battery line 200 is connected to a high voltage battery core 210. The second radiator 220 is provided on the battery line 200, and the coolant may be circulated therethrough with the power from a second pump 230. The second radiator 220 may be cooled by ambient air.

The battery line 200 includes the second pump 230 that is controlled to be driven and stopped by a controller 900 to be described later, and the second pump 230 circulates the coolant through the battery line 200 when driven.

The high voltage battery core 210 may be a heat dissipation unit directly or indirectly connected to the high voltage battery. As the coolant cooled through the second radiator 220 by the ambient air is introduced into the high voltage battery core 210, the high voltage battery may be cooled.

The integration line 300 branches from the electrical component line 100 and the battery line 200, respectively, so that the coolant from the electrical component line 100 and the coolant from the battery line 200 may be selectively introduced therethrough. In addition, the integration line 300 may extend along the flow direction of the coolant into the electric component line 100 and the battery line 200, respectively.

In particular, the integration line 300 may extend into the electric component line 100 and the battery line 200 while bypassing the first radiator 120 or the second radiator 220.

The refrigerant line 400 may include an expansion valve, a cooling core 440 for indoor air conditioning, a compressor 420, and an air-cooled condenser 410. The air-cooled condenser 410 may cool the refrigerant contained therein by using ambient air of a vehicle. The compressor 420 may be driven or stopped by the controller 900 to compress the refrigerant to high temperature and high pressure. The refrigerant may expand with the operation of the expansion valve and exchange heat with air introduced into the interior of a vehicle through the indoor air conditioning cooling core 440 so as to cool the introduced air.

The refrigerant line 400 may branch into the indoor air conditioning cooling core 440 and the chiller 500 at the point passing through the air-cooled condenser 410. That is, the refrigerant liquefied by the air-cooled condenser 410 may be vaporized by absorbing heat from the cooling core 440 and the chiller 500. An expansion valve may be provided in the indoor air conditioning cooling core 440 and the chiller 500, respectively.

The chiller 500 may be provided such that the refrigerant from the refrigerant line 400 and the coolant from the integration line 300 may exchange heat with each other. The refrigerant and the coolant may exchange heat with each other in a separated state without being mixed together. In particular, the refrigerant may be heated by recovering waste heat of the coolant, and the coolant may be cooled by the refrigerant.

The control valve 600 may be a multi-valve in which a plurality of inlets or outlets are formed, and may be located at a branch point from which the integration line branches into the electric component line 100 and the battery line 200. The control valve 600 may adjust the coolant from the integration line 300 through the chiller 500 to flow into the electric component line 100 or the battery line 200.

While a conventional thermal management circuit is configured such that the chiller 500 is provided to heat exchange with the electric component line 100 and the battery line 200, respectively, or coolant separately flows into a single chiller 500, the present invention is configured such that the waste heat of the coolant selectively introduced into the integration line 300 in which the electric component line 100 and the battery line 200 are integrated may be recovered by using the refrigerant introduced into the integrated chiller 500.

Accordingly, the present invention has the effects of reducing the number of the parts required, increasing space utilization and packaging efficiency, and reducing the manufacturing cost.

Specifically, the integration line 300 may branch at a point before the coolant that has passed through the electric components in the electric component line 100 flows into the first radiator 120.

In addition, the integration line 300 may branch at a point before the coolant that has passed through the high voltage battery in the battery line 200 flows into the second radiator 220.

That is, the coolant from the electric component line 100 or the coolant from the high voltage battery line 200 may be introduced into the chiller 500 of the integration line 300 while bypassing the first radiator 120 or the second radiator 220.

Accordingly, the coolant may be introduced into the integration line 300 while being heated by the electric component or the high voltage battery so that the waste heat may be recovered.

The coolant having passed through the first radiator 120 in the electronic component line 100 and the coolant having passed through the second radiator 220 in the battery line 200 may separately flow into a reservoir tank 700.

The reservoir tank 700 may be connected to the electric component line 100 and the battery line 200. In particular, the reservoir tank 700 may separately store the coolant in a first reservoir part and a second reservoir part.

The coolant that has passed through the first radiator 120 and the second radiator 220 flows into the first reservoir part and the second reservoir part, respectively. The coolant stored in the first reservoir part and the second reservoir part is then introduced into the control valve 600 so that the coolant may flow again to the electric components in the electric component line 100 or the high voltage battery in the battery line 200.

The control valve 600 may adjust a flow ratio between the coolant from the electric component line 100 through the first radiator 120 and the coolant from the integration line 300 through the chiller 500.

In the control valve 600, the coolant from the electric component line 100 through the first radiator 120 and the reservoir tank 700 and the coolant from the integration line 300 through the chiller 500 are selectively introduced and discharged toward the electric components in the electric component line 100. The first pump 130 may be located on the electric component line 100 between the control valve 600 and the electric component.

The control valve 600 may adjust a flow ratio between the coolant from the battery line 200 through the second radiator 220 and the coolant from the integration line 300 through the chiller 500.

In the control valve 600, the coolant from the battery line 200 through the second radiator 220 and the reservoir tank 700 and the coolant from the integration line 300 through the chiller 500 are selectively introduced and discharged toward the high voltage battery in the battery line 200. The second pump 230 may be located on the battery line 200 between the control valve 600 and the high voltage battery.

More specifically, the control valve 600 has a plurality of inlets and outlets, wherein the inlets may be connected to the first radiator 120 of the electrical component line 100, the second radiator 220 of the battery line 200, and the chiller 500 of the integration line 300, respectively, and the outlets may be connected to the electric component in the electric component line 100 and the high voltage battery in the battery line 200, respectively.

The control valve 600 may be a 5-way valve having three inlets and two outlets in an embodiment.

Specifically, the coolant flowing into the control valve 600 from the first radiator 120 in the electric component line 100 may flow toward the electric component in the electric component line 100, and the coolant flowing into the second radiator in the battery line 200 may flow toward the high voltage battery in the battery line 200. The coolant introduced into the control valve 600 from the chiller 500 of the integration line 300 may be adjusted to selectively flow toward the electric component in the electric component line 100 or the high voltage battery in the battery line 200.

In particular, the control valve 600 may adjust the flow ratio of the coolant such that as the coolant introduced from the chiller 500 of the integration line 300 increases, the coolant introduced from the first radiator 120 of the electric component line 100 or the second radiator 220 of the battery line 200 is reduced.

The thermal management circuit may further include: an indoor heating line 800 in which coolant flows and having a heating core 820 for indoor air conditioning, a water heater 840, and a water-cooled condenser 430 provided to be heat-exchanged with a refrigerant from the refrigerant line 400; and a first battery heating line and a second battery heating line branching from or jointed to the indoor heating line 800 and connected to an upstream point and a downstream point, respectively, of the high voltage battery in the battery line 200 from the high voltage battery. A heating control valve 810 may be provided at a point where the indoor heating line 800 branches into the first battery heating line or the second battery heating line is joined to the indoor heating line 800.

The indoor heating line 800 may be connected to the battery line 200 through the first battery heating line and the second battery heating line, and the flow of coolant between the indoor heating line 800 and the battery line 200 may be allowed or blocked by the heating control valve 810 provided at the branching point or the joining point.

The indoor heating line 800 may be provided with a third pump 830, and the coolant may be circulated through the indoor heating line 800 with the driving of the third pump 830.

Figure 3:
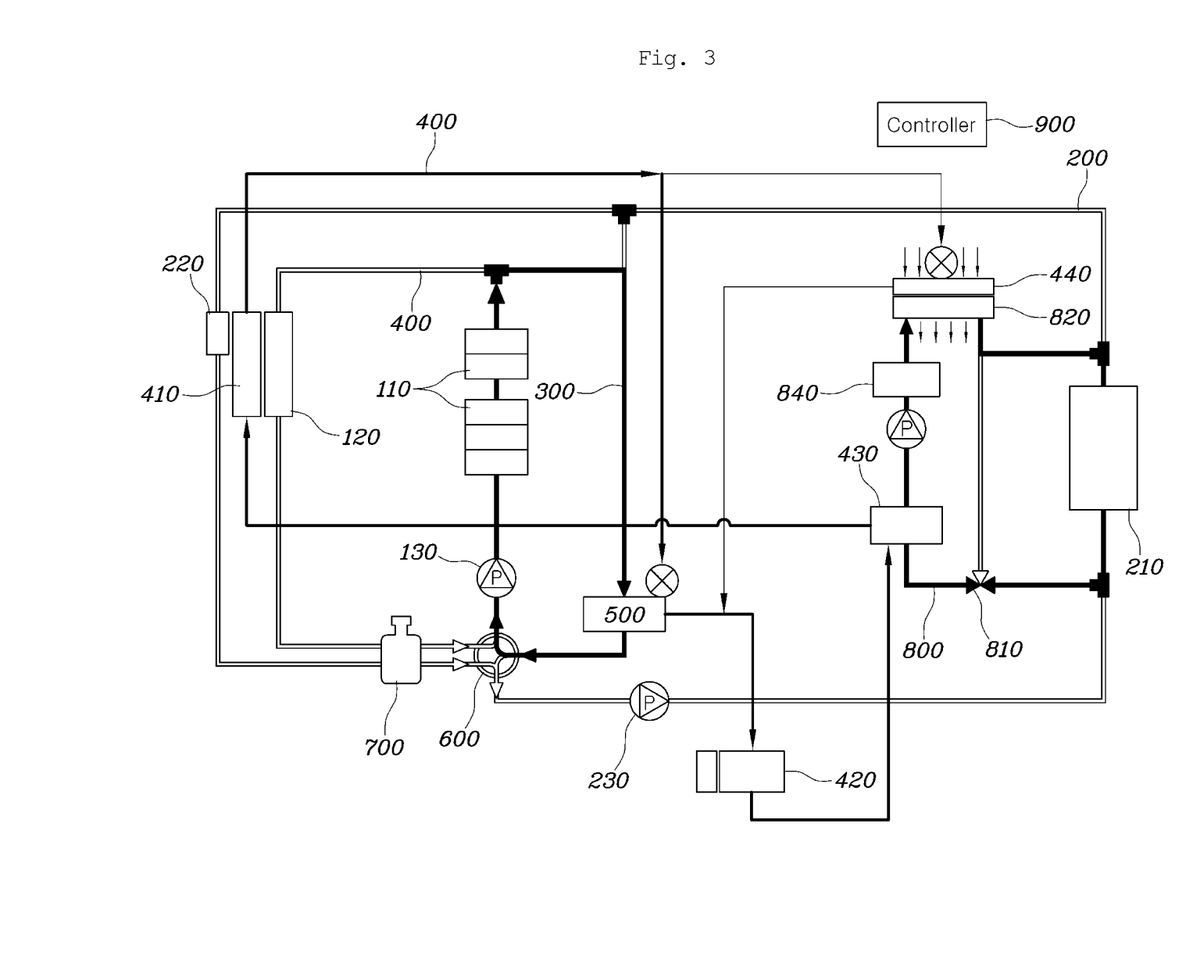
FIGS. 3 to 4 illustrate control modes included in a first mode of the integrated thermal management circuit of a vehicle according to an exemplary embodiment of the present invention.
Figure 4:
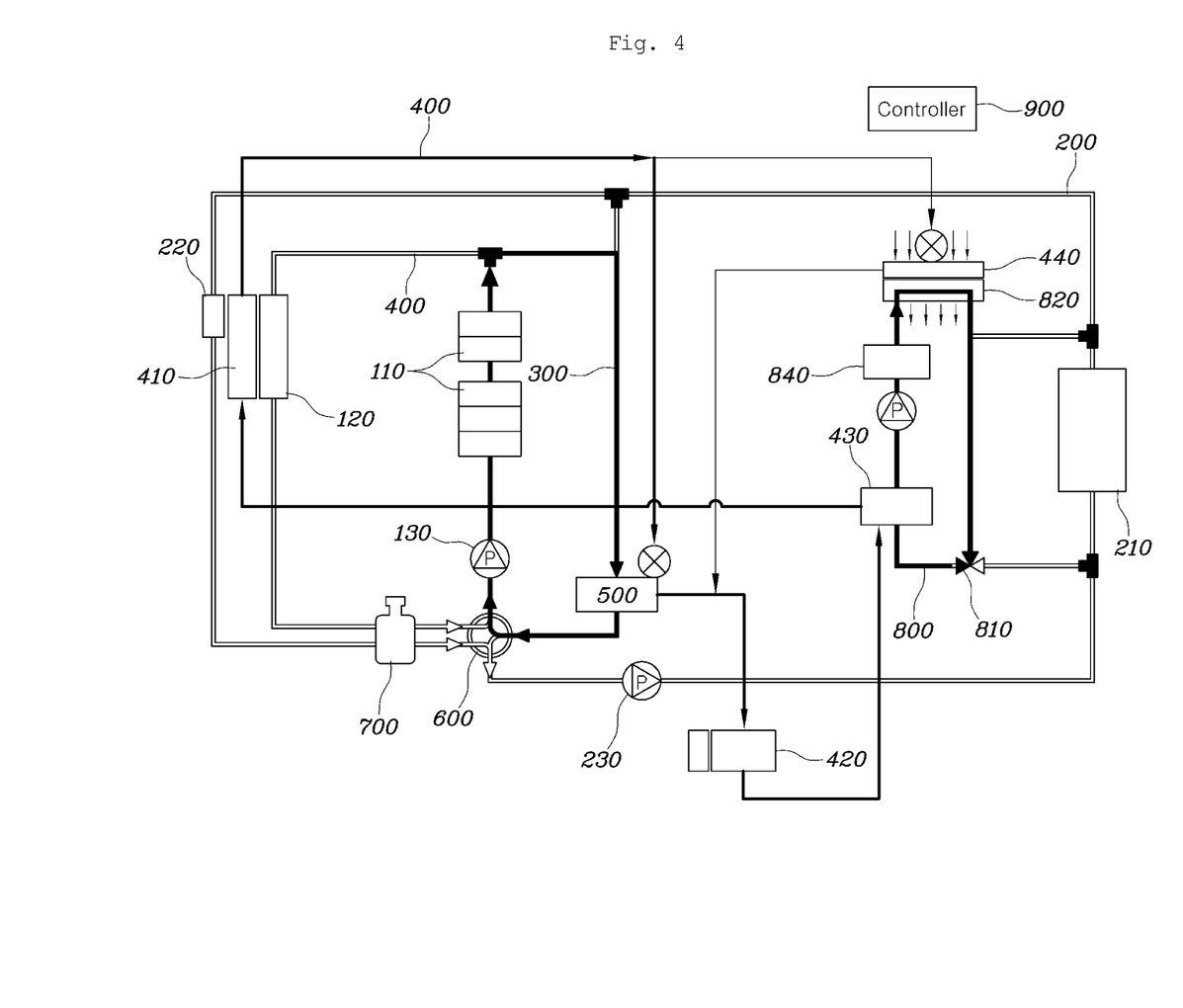

FIGS. 3 to 4 illustrate control modes included in a first mode of the integrated thermal management circuit of a vehicle according to an exemplary embodiment of the present invention.

Referring further to FIGS. 3 and 4, the thermal management circuit may further include a controller 900 for controlling the control valve 600 for controlling the coolant from the integration line 300 through the chiller 500 to flow into the electric component line 100 or the battery line 200. The controller 900 may be configured to control the control valve 600 to allow the coolant from the integration line 300 through the chiller 500 to flow into the electric component line 100 in a first mode for recovering the waste heat of the electrical component with a refrigerant.

Specifically, the first mode is a mode in which the waste heat of the electric component is recovered in the chiller 500 such that the coolant from the electric component line 100 is cooled through the chiller 500.

Particularly, as shown in FIG. 3, in the first mode, a high voltage battery is heated in a battery heating mode by using waste heat of electrical components recovered from a refrigerant through the water-cooled condenser 430 provided in the indoor heating line 800.

In the battery heating mode, the heating control valve 810 may be controlled such that the coolant from the indoor heating line 800 flows into the high voltage battery through the first battery heating line and the second battery heating line, and the second pump 230 may not be driven so that the coolant from the battery line 200 does not flow.

When additional heating is required in the battery heating mode, the water heater 840 provided in the indoor heating line 800 may be further operated.

As shown particularly in FIG. 4, in the first mode, air for indoor air-conditioning is heated in an indoor heating mode by using the waste heat of the electrical components recovered from the refrigerant through the water-cooled condenser 430 provided in the indoor heating line 800.

The coolant heated by the water-cooled condenser 430 in the indoor heating line 800 may flow into a heater core for indoor air conditioning to heat the air introduced into the interior of a vehicle for indoor air conditioning. That is, the waste heat of the electrical component may be recovered to heat the indoor air.

When additional heating is required in the indoor heating mode, the water heater 840 provided in the indoor heating line 800 may be further operated.

In the indoor heating mode, the heating control valve 810 may be controlled so that the coolant of the indoor heating line 800 does not flow to the first battery heating line and the second battery heating line. In addition, the second pump 230 may not be driven so that the refrigerant of the battery line 200 does not flow.

Figure 5:
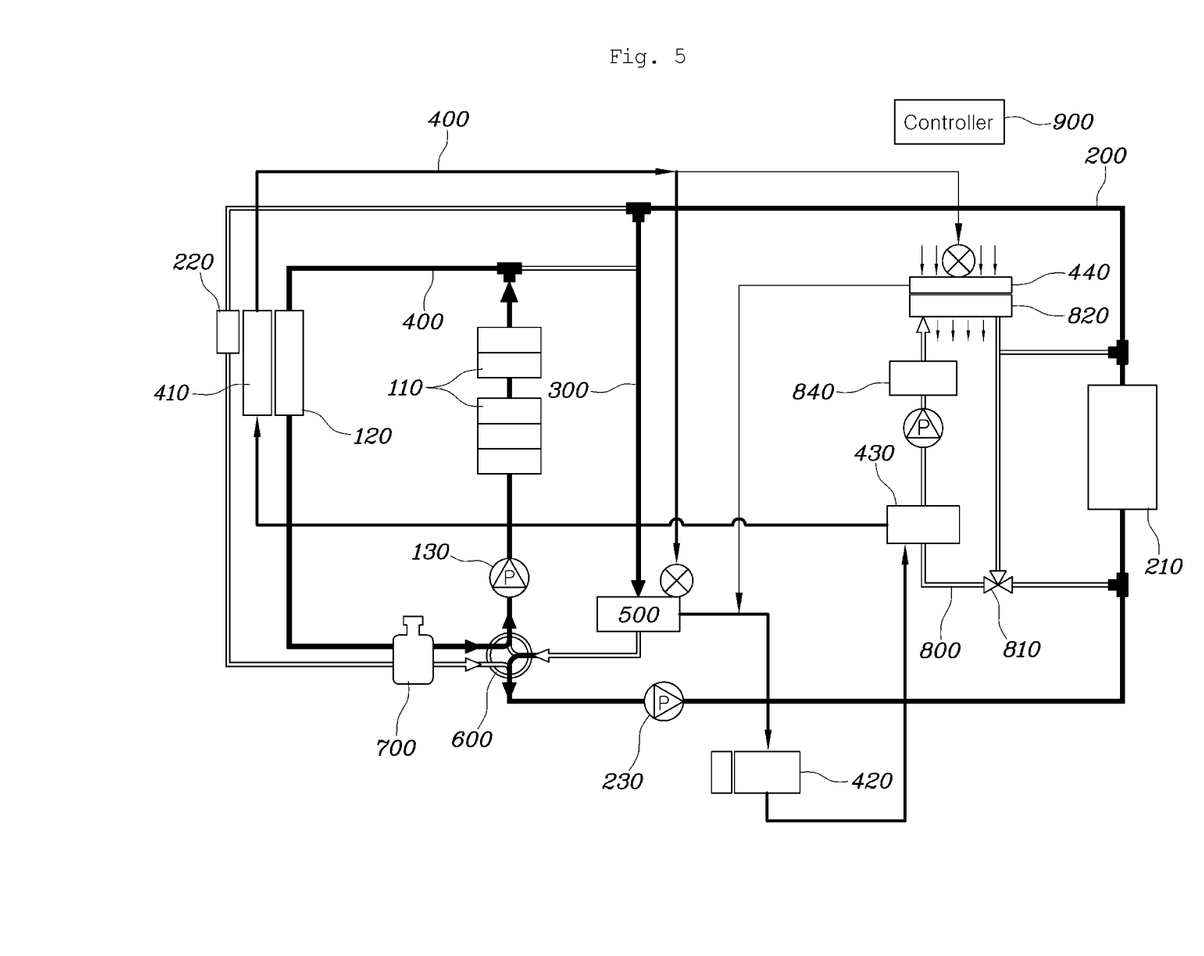
FIGS. 5 to 6 illustrate control modes included in a second mode of the integrated thermal management circuit of a vehicle according to an exemplary embodiment of the present invention.
Figure 6:
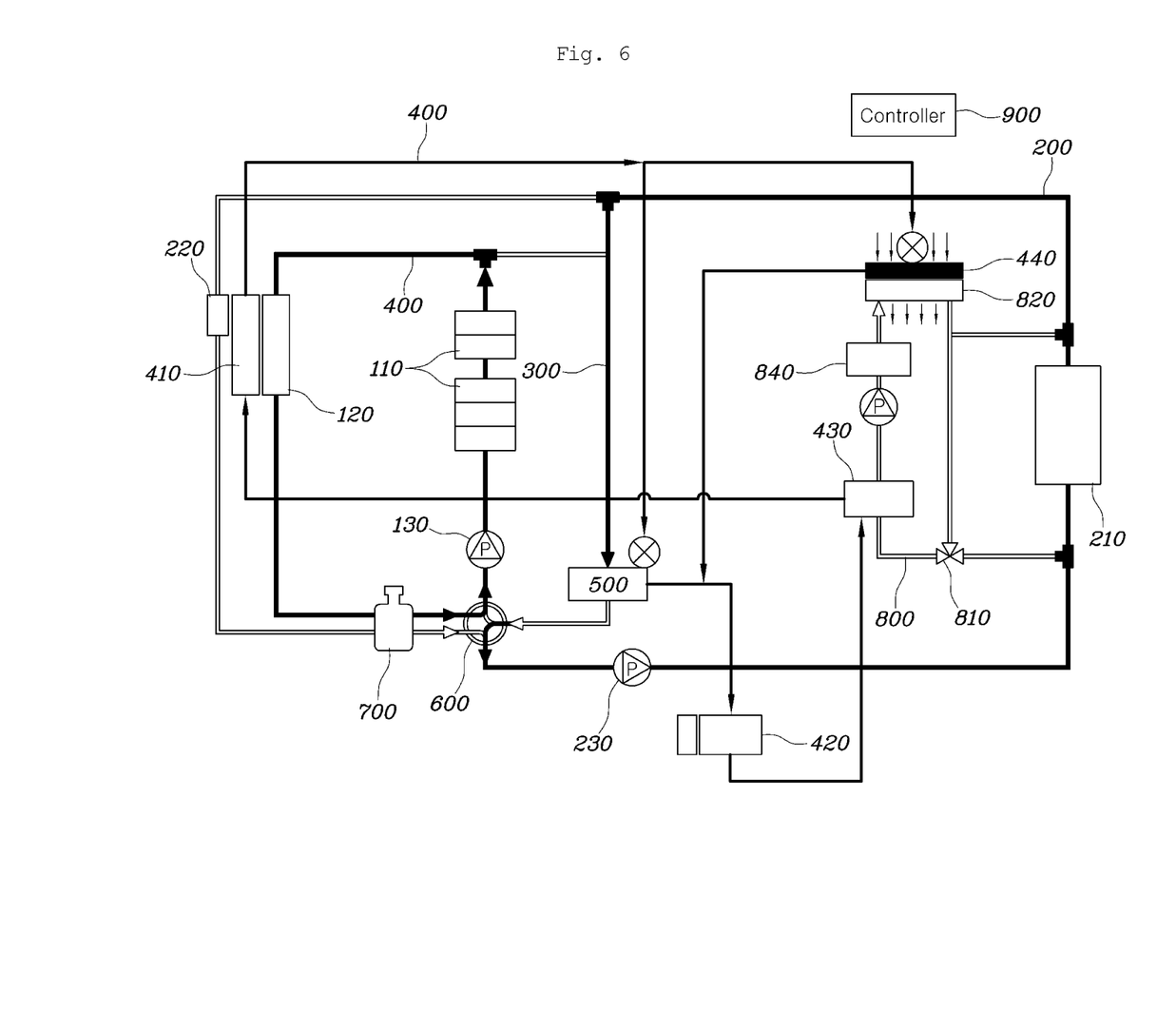

FIGS. 5 to 6 illustrate control modes included in a second mode of the integrated thermal management circuit of a vehicle according to an exemplary embodiment of the present invention.

Referring further to FIGS. 5 and 6, the thermal management circuit may further include a controller 900 for controlling the control valve 600 for controlling the coolant from the integration line 300 through the chiller 500 to flow into the electric component line 100 or the battery line 200. The controller 900 may be configured to control the control valve 600 to allow the coolant from the integration line 300 through the chiller 500 to flow into the battery line 200 in a second mode for recovering the waste heat of the high voltage battery with a refrigerant.

Specifically, the second mode is a mode in which the waste heat of the high voltage battery is recovered in the chiller 500 such that the coolant from the battery line 200 is cooled through the chiller 500.

Particularly, as shown in FIG. 5, in the second mode, the coolant from the battery line 200 is cooled in the chiller 500 and the refrigerant from the refrigerant line 400 is allowed to flow into the chiller 500 in a battery cooling mode to recover the waste heat of the high voltage battery.

The electric component line 100 may be cooled by the first radiator 120 in the battery cooling mode.

In particular, as shown in FIG. 6, in the second mode, the indoor air may be cooled in an indoor cooling mode by allowing the refrigerant to flow into the indoor air conditioning cooling core 440.

In the indoor cooling mode, the refrigerant condensed through the condenser may branch and flow into the chiller 500 and the indoor air conditioning cooling core 440. The condensed refrigerant may absorb heat while evaporating from the chiller 500 and the cooling core 440 for indoor air conditioning.

Figure 7:
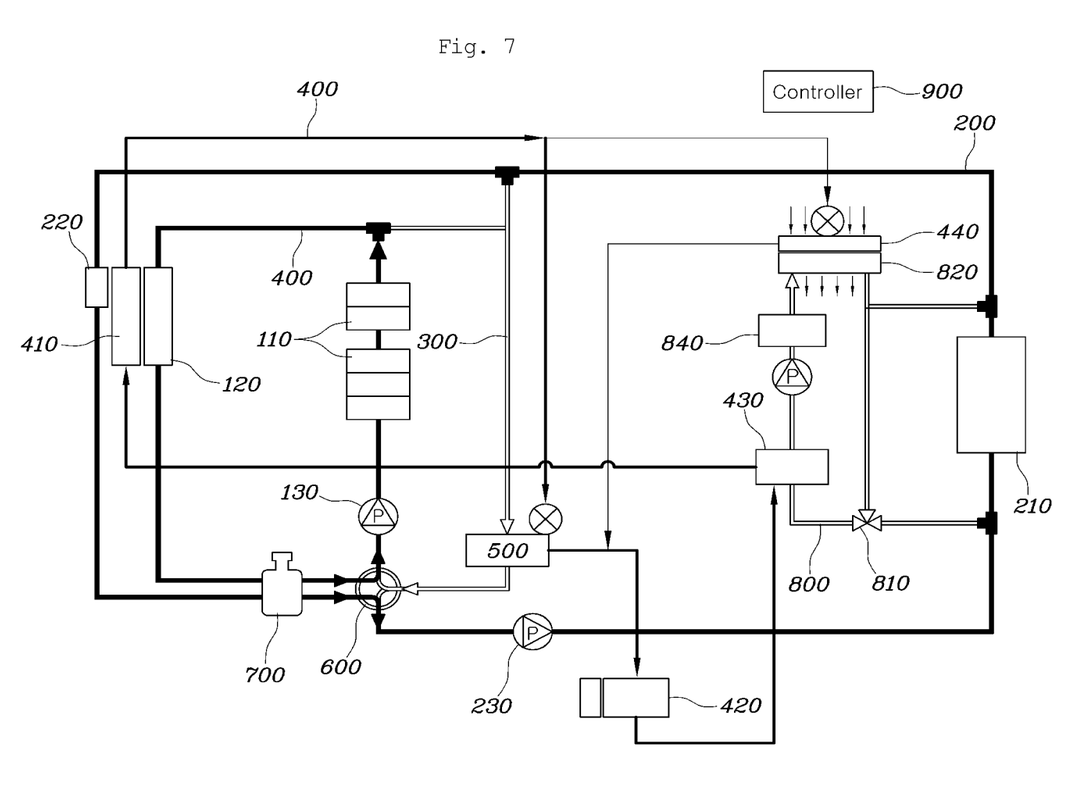
FIG. 7 illustrates a control mode included in a third mode of the integrated thermal management circuit of a vehicle according to an embodiment of the present invention.

FIG. 7 illustrates a control mode included in a third mode of the integrated thermal management circuit of a vehicle according to an embodiment of the present invention.

Referring further to FIG. 7, the thermal management circuit may further include a controller 900 for controlling the control valve 600 for controlling the coolant from the integration line 300 through the chiller 500 to flow into the electric component line 100 or the battery line 200. The controller 900 may be configured to control the control valve 600 to block the coolant from the integration line 300 from flowing in a third mode in which the waste heat of the electric component or the high voltage battery is not recovered.

In the third mode, the coolant from the integration line 300 may be blocked from flowing. In addition, the control valve 600 may be controlled such that respective coolant from the electric component line 100 and the battery line 200 communicates with each other.

In the third mode, the respective coolant from the electric component line 100 and the battery line 200 may be cooled in the first radiator 120 and the second radiator 220 in an ambient air cooling mode. In the ambient air cooling mode, the flow of the coolant may be controlled separately in the electric component line 100 and the battery line 200 depending on whether the first pump 130 and the second pump 230 are driven or not. That is, the respective coolant from the electric component line 100 and the battery line 200 may be controlled in the ambient air cooling mode for the electric component and the ambient air cooling mode for the battery.

In addition, in the third mode, by circulating the refrigerant from the refrigerant line 400, an indoor air cooling mode may be implemented for cooling the indoor air using the cooling core 440 for indoor air conditioning.

In addition, an indoor air heating mode may be implemented in which the indoor air is heated through the indoor air heating core by circulating a high-temperature refrigerant into the water-cooled condenser 430 so that heat of the water-cooled condenser 430 is absorbed in the indoor heating line 800.

In addition, a battery heating node may be implemented in which the battery is heated by circulating the high-temperature refrigerant into the water-cooled condenser 430 so that heat of the water-cooled condenser 430 is absorbed in the indoor heating line 800, and flowing the coolant from the indoor heating line 800 into the first battery heating line and the second battery heating line.

In addition, in order to implement a dehumidification mode for dehumidifying indoor air, a cooling operation is performed by the indoor air conditioning cooling core 440 using the refrigerant from the refrigerant line 400, and a heating operation is performed by the indoor air conditioning heating core 820 using the coolant from the indoor heating line 800 at the same time.

In addition, the coolant from the indoor heating line 800 through the first battery heating line and the second battery heating line may be introduced into the high voltage battery for cooling the battery. In particular, this case is a case in which the ambient temperature is low, such as in winter, and may be used upon rapid charging of a battery at which the high voltage battery may be heated.

Figure 8:
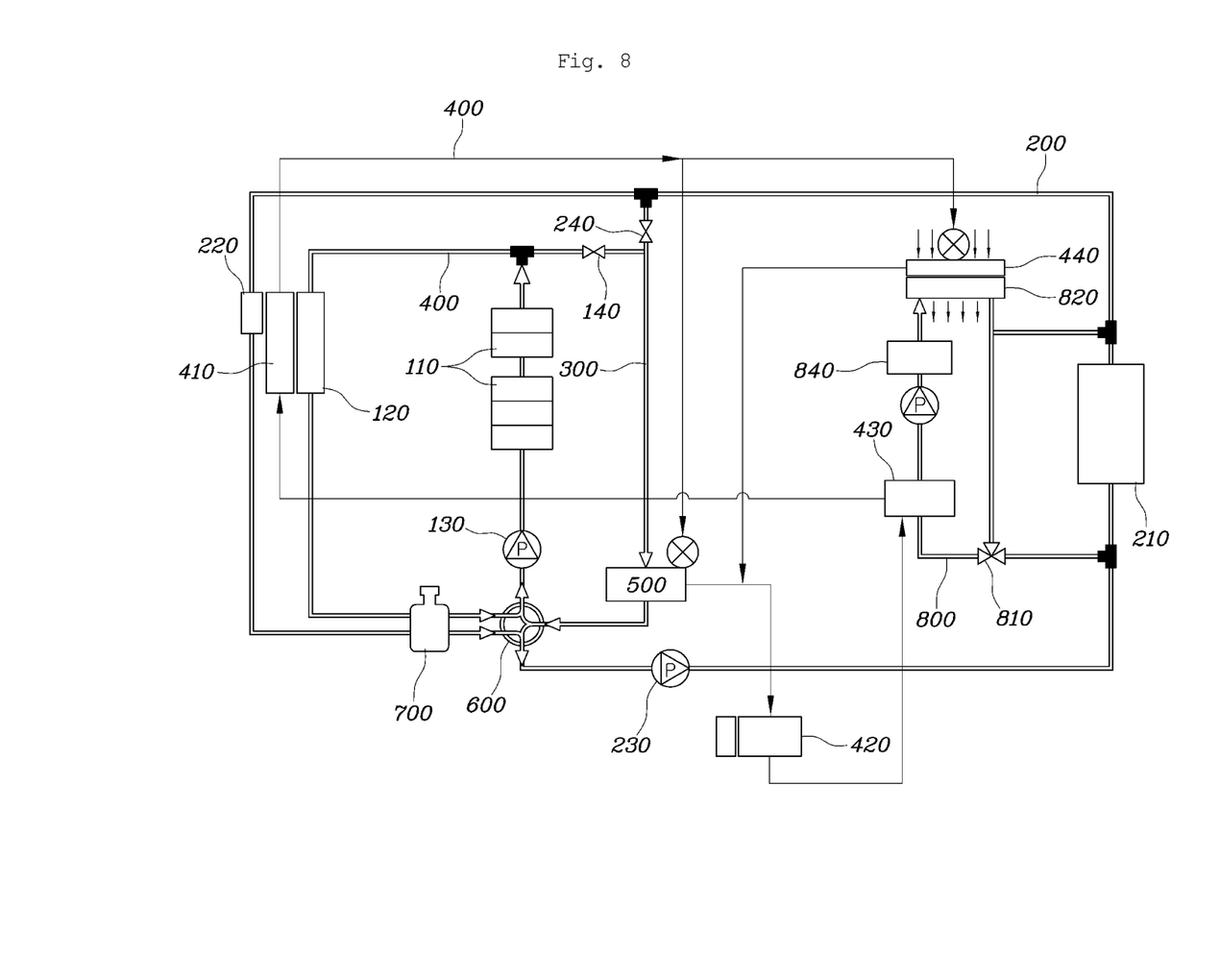
FIG. 8 is a circuit diagram illustrating an integrated thermal management circuit of a vehicle according to another exemplary embodiment of the present invention.

FIG. 8 is a circuit diagram illustrating an integrated thermal management circuit of a vehicle according to another exemplary embodiment of the present invention.

Referring to FIG. 8, the integrated thermal management circuit of a vehicle may further include first and second shut-off valves 140 and 240 that are located at a point branching from the electric component line 100 or the battery line 200 and joined to the integration line 300 to block or allow the flow of coolant.

The first shut-off valve 140 is located at a point branching from the electrical component line 100 and jointed to the integration line 300, and the second shut-off valve 240 is located at a point branching from the battery line 200 before joined to the integration line 300.

The first shut-off valve 140 and the second shut-off valve 240 may solve the problem of the coolant from the electric component line 100 and the coolant from the battery line 200 being mixed when flowing in the reverse direction.

In an embodiment, the first shut-off valve 140 and the second shut-off valve 240 may be a check valve capable of blocking the reverse flow.

In another embodiment, the first shut-off valve 140 and the second shut-off valve 240 may be an on/off control valve controlled to allow or block the flow of the coolant by the controller 900.

Accordingly, respective coolant from the electric component line 100 and the battery line 200, which are joined and integrated into the integration line 300, may be blocked from being mixed with each other.

Figure 9:
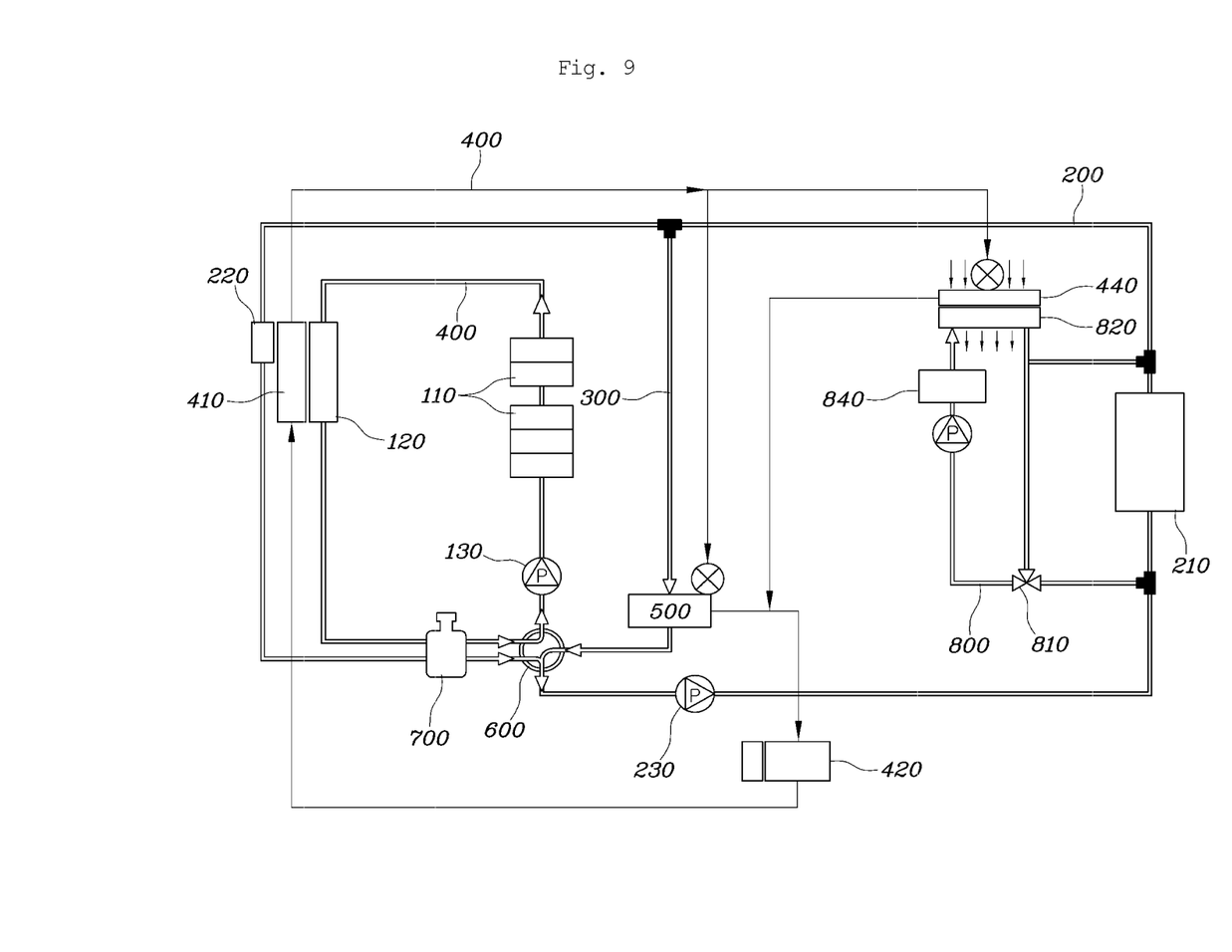
FIG. 9 is a circuit diagram illustrating an integrated thermal management circuit of a vehicle according to a further exemplary embodiment of the present invention.

FIG. 9 is a circuit diagram illustrating an integrated thermal management circuit of a vehicle according to a further exemplary embodiment of the present invention.

Referring to FIG. 9, the integrated thermal management circuit for a vehicle includes: an electrical component line 100 having a first radiator 120 and in which coolant flowing therein heat-exchanges with electrical components; a battery line 200 having a second radiator 220 and in which coolant flowing therein heat-exchanges with a high voltage battery; an integration line 300 branching from the electrical component line 100 and joined to the battery line 200 while bypassing the first radiator 120; a refrigerant line 400 having a cooling core 440 for indoor air conditioning and in which a refrigerant flows; a chiller 500 connected to the integration line 300 and the refrigerant line 400 so that the coolant from the electric component line 100 or the battery line 200 and the refrigerant from the refrigerant line 400 exchange heat with each other; and a control valve 600 operable to control a flow ratio between the coolant from the integration line 300 through the chiller 500 and the coolant from the battery line 200 through the second radiator 220.

In the integrated thermal management circuit, only the battery line 200 branches into the integration line 300, and the electric component line 100 is provided separately from the integration line 300.

That is, the integration line 300 and the chiller 500 may be configured to recover only the waste heat of the high voltage battery, without recovering the waste heat of the electric component.

The coolant from the electric component line 100 through the first radiator 120 may flow toward the electric component in the electric component line 100 through the control valve 600.

On the other hand, the coolant from the battery line 300 through the second radiator 220 and the coolant from the integration line 300 through the chiller 500 may be controlled by the control valve 600 to selectively flow toward the high voltage battery in the battery line 200.

In addition, a heat pump for transferring the waste heat of the high voltage battery absorbed in the chiller 500 to the coolant from the indoor heating line 800 may be omitted by moving the water-cooled condenser 430 of the refrigerant line 400.

Accordingly, when there is no need to recover the waste heat of the electric component, the integrated thermal management circuit may be simplified by configuring the circuit so as not to connect the electric component line 100 and the chiller 500.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An integrated thermal management circuit for a vehicle, the integrated thermal management circuit comprising:
   an electrical component line in which coolant flowing therein heat-exchanges with electrical components and having a first radiator;
   a battery line in which coolant flowing therein heat-exchanges with a battery and having a second radiator;
   an integration line branching from the electrical component line and the battery line and extending, at a branch point thereof, to the electrical component line and the battery line, respectively, so that respective coolant from the electrical component line and the battery line is joined and flows into the electrical component line and the battery line, respectively, at the branch point, along a flow direction;
   a refrigerant line having a cooling core for indoor air conditioning and in which refrigerant flows;
   a chiller connected to the integration line and the refrigerant line so that the coolant from the electric component line or the battery line and the refrigerant from the refrigerant line exchange heat with each other; and
   a control valve positioned at the branch point of the integration line to control a flow of coolant from the integration line through the chiller,
   wherein the coolant having passed through the first radiator in the electrical component line and the coolant having passed through the second radiator in the battery line separately flow into a reservoir tank.

2. The integrated thermal management circuit according to claim 1, wherein the integration line branches at a point before the coolant that has passed through the electric components in the electric component line flows into the first radiator.

3. The integrated thermal management circuit according to claim 1, wherein the integration line branches at a point before the coolant that has passed through the battery in the battery line flows into the second radiator.

4. The integrated thermal management circuit according to claim 1, wherein the control valve is operable to adjust a flow ratio between the coolant from the electric component line through the first radiator and the coolant from the integration line through the chiller.

5. The integrated thermal management circuit according to claim 1, wherein the control valve is operable to adjust a flow ratio between the coolant from the battery line through the second radiator and the coolant from the integration line through the chiller.

6. The integrated thermal management circuit according to claim 1, wherein the control valve has a plurality of inlets and outlets, wherein the inlets are connected to the first radiator of the electrical component line, the second radiator of the battery line, and the chiller of the integration line, respectively, and the outlets are connected to the electric component in the electric component line and the battery in the battery line, respectively.

7. The integrated thermal management circuit according to claim 1, further comprising:
- an indoor heating line in which coolant flows and having a heating core for indoor air conditioning, a water heater, and a water-cooled condenser provided to be heat-exchanged with a refrigerant from the refrigerant line; and
- a first battery heating line and a second battery heating line branching from or jointed to the indoor heating line and connected to an upstream point and a downstream point, respectively, of the battery in the battery line from the battery,
- wherein a heating control valve is provided at a point where the indoor heating line branches into the first battery heating line, or the second battery heating line is joined to the indoor heating line.

8. The integrated thermal management circuit according to claim 1, further comprising:
- a controller configured to control the control valve for controlling the coolant from the integration line through the chiller to flow into the electric component line or the battery line,
- wherein the controller is configured to control the control valve to allow the coolant from the integration line through the chiller to flow into the electric component line in a first mode for recovering the waste heat of the electrical component with a refrigerant.

9. The integrated thermal management circuit according to claim 1, further comprising:
- a controller configured to control the control valve for controlling the coolant from the integration line through the chiller to flow into the electric component line or the battery line,
- wherein the controller is configured to control the control valve to allow the coolant from the integration line through the chiller to flow into the battery line in a second mode for recovering the waste heat of the battery with a refrigerant.

10. The integrated thermal management circuit according to claim 1, further comprising:
- a controller configured to control the control valve for controlling the coolant from the integration line through the chiller to flow into the electric component line or the battery line,
- wherein the controller is configured to control the control valve to block the coolant from the integration line from flowing in a third mode in which the waste heat of the electric component or the battery is not recovered.

11. The integrated thermal management circuit according to claim 1, further comprising:
- a shut-off valve located at a point branching from the electric component line or the battery line and joined to the integration line to block or allow a flow of coolant.

12. An integrated thermal management circuit for a vehicle, the integrated thermal management circuit comprising:
- an electrical component line in which coolant flowing therein heat-exchanges with electrical components and having a first radiator;
- a battery line in which coolant flowing therein heat-exchanges with a battery and having a second radiator;
- an integration line branching from the electrical component line and joined to the battery line while bypassing the first radiator;
- a refrigerant line having a cooling core for indoor air conditioning and in which refrigerant flows;
- a chiller connected to the integration line and the refrigerant line so that the coolant from the electric component line or the battery line and the refrigerant from the refrigerant line exchange heat with each other; and
- a control valve operable to control a flow ratio between the coolant from the integration line through the chiller and the coolant from the battery line through the second radiator,
- wherein the coolant having passed through the first radiator in the electrical component line and the coolant having passed through the second radiator in the battery line separately flow into a reservoir tank.

* * * * *